(12) United States Patent
Fitzgibbon et al.

(10) Patent No.: US 10,253,057 B2
(45) Date of Patent: Apr. 9, 2019

(54) METHOD OF COALESCING A SUBSTANCE

(71) Applicant: RENMATIX, INC., King of Prussia, PA (US)

(72) Inventors: Patrick David Fitzgibbon, Avondale, PA (US); Thomas Arthur Kindler, Acworth, GA (US); Todd Michael McLarty, Acworth, GA (US); Charles Sebastian Sanderson, Wayne, PA (US); Michael L. Smith, Kennesaw, GA (US)

(73) Assignee: Renmatix, Inc., King of Prussia, PA (US)

( * ) Notice: Subject to any disclaimer, the term of this patent is extended or adjusted under 35 U.S.C. 154(b) by 0 days.

(21) Appl. No.: 15/525,604

(22) PCT Filed: Nov. 12, 2014

(86) PCT No.: PCT/US2014/065156
§ 371 (c)(1),
(2) Date: May 10, 2017

(87) PCT Pub. No.: WO2016/076845
PCT Pub. Date: May 19, 2016

(65) Prior Publication Data
US 2017/0327523 A1 Nov. 16, 2017

(51) Int. Cl.
*C07G 1/00* (2011.01)
*C08H 7/00* (2011.01)
*C08H 8/00* (2010.01)
*C08B 37/00* (2006.01)

(52) U.S. Cl.
CPC ............ *C07G 1/00* (2013.01); *C08B 37/0057* (2013.01); *C08H 6/00* (2013.01); *C08H 8/00* (2013.01)

(58) Field of Classification Search
CPC ...................................................... C07G 1/00
See application file for complete search history.

(56) References Cited

U.S. PATENT DOCUMENTS

| | | | |
|---|---|---|---|
| 2,623,040 A | 12/1952 | Keilen, Jr. et al. | |
| 2,813,090 A | 11/1957 | Ball | |
| 3,808,192 A | 4/1974 | Dimitri | |
| 4,017,642 A | 4/1977 | Orth, Jr. et al. | |
| 5,744,520 A | 4/1998 | Kmiecik-Lawrynowicz et al. | |
| 8,057,639 B2 | 11/2011 | Pschorn et al. | |
| 8,317,928 B1 | 11/2012 | Iyer et al. | |
| 8,585,863 B2 | 11/2013 | Retsina et al. | |
| 8,663,800 B2 | 3/2014 | Kadam et al. | |
| 8,747,561 B2 | 6/2014 | Tao | |
| 8,801,859 B2 | 8/2014 | Simard et al. | |
| 2006/0014992 A1 | 1/2006 | Stell et al. | |
| 2009/0014992 A1 | 1/2009 | Matsuura et al. | |
| 2009/0038212 A1 | 2/2009 | Cooper | |
| 2009/0176286 A1 | 7/2009 | O'Connor et al. | |
| 2011/0094505 A1 | 4/2011 | Bulla et al. | |
| 2011/0151516 A1 | 6/2011 | Van Der Heide et al. | |
| 2012/0138546 A1 | 6/2012 | Bonanni et al. | |
| 2012/0175549 A1* | 7/2012 | Yoshihara ................ C09K 5/14 252/79 |
| 2012/0282465 A1 | 11/2012 | Kadam et al. | |
| 2013/0145995 A1 | 6/2013 | Simard | |
| 2013/0171397 A1 | 7/2013 | Ghosh et al. | |
| 2013/0252293 A1 | 9/2013 | Chen et al. | |
| 2014/0014092 A1 | 1/2014 | Kazachkin et al. | |

FOREIGN PATENT DOCUMENTS

| | | | |
|---|---|---|---|
| CA | 609565 A | 11/1960 | |
| CA | 1284637 C | 6/1991 | |
| DE | 534621 C | 9/1931 | |
| DE | 1058057 B | 5/1959 | |
| EP | 0442806 A1 | 8/1991 | |
| EP | 2336195 A1 | 6/2011 | |
| EP | 2336196 A1 | 6/2011 | |
| GB | 816281 A | 7/1959 | |
| RU | 2508301 C1 | 2/2014 | |
| WO | WO-2012/151531 A2 | 11/2012 | |
| WO | WO-2013/002708 A1 | 1/2013 | |
| WO | WO-2013/162881 A1 | 10/2013 | |
| WO | WO-2014074066 A1 * | 5/2014 | ............... C13K 1/02 |

OTHER PUBLICATIONS

Liao et al. (International Journal of Heat and Mass Transfer 111 (2017) 246-265) (Year: 2017).*
Liu, C. and Wyman, C.E., The effect of flow rate of compressed hot water on xylan, lignin, and total mass removal from corn stover. Ind Eng Chem Res. 2003; 42 (21):5409-16.
Sluiter et al., Determination of Structural Carbohydrates and Lignin in Biomass. Nat Renewable Energy Laboratory. Technical Report NREL/TP-510-42618. 2008; 19 pages.
International Search Report and Written Opinion dated Jul. 25, 2015 by the International Searching Authority for International Patent Application No. PCT/US2014/065156, which was filed on Nov. 12, 2014 and published as WO 2016/076845 on May 19, 2016 (Inventor—Fitzgibbon et al.; Applicant—Renmatix, Inc.;) (16 pages).
International Preliminary Report on Patentability dated May 16, 2017 by the International Searching Authority for International Patent Application No. PCT/US2014/065156, which was filed on Nov. 12, 2014 and published as WO 2016/076845 on May 19, 2016 (Inventor—Fitzgibbon et al.; Applicant—Renmatix, Inc.;) (12 pages).
Donohoe et al.: "Visualizing lignin coalescence and migration through maize cell walls following thermochemical pretreatment", Biotechnology and Bioengineering, vol. 101, No. 5, (2008), pp. 913-925.

(Continued)

*Primary Examiner* — Liam J Heincer
(74) *Attorney, Agent, or Firm* — Ballard Spahr LLP

(57) ABSTRACT

Provided is a method of coalescing a substance comprising providing a first mixture comprising a substance, agitating at least a portion of the first mixture under turbulent conditions for a first time period, thereby causing particles comprising and substance to collide and form into larger particles.

17 Claims, No Drawings

(56) References Cited

OTHER PUBLICATIONS

Hayley et al.: "Manufacture of lignin microparticles by antisolvent precipitation: Effect of preparation temperature and presence of sodium dodecyl sulfate", Food Research International, vol. 66, (2014),pp. 93-99.
Lima et al.: "Effects of pretreatment on morphology, chemical composition and enzymatic digestibility of eucalyptus bark: a potentially valuable source of fermentable sugars for biofuel production—pa", Biotechnology for Biofuels, Biomed Central LTD, vol. 6, No. 1, (2013), p. 75.
Selig et al.: "Deposition of Lignin Droplets Produced During Dilute Acid Pretreatment of Maize Stems Retards Enzymatic Hydrolysis of Cellulose", Biotechnology Progress., vol. 23, No. 6, (2007) pp. 1333-1339.
Xiao et al.: "Impact of hot compressed water pretreatment on the structural changes of woody biomass for bioethanol production", Bioresources, vol. 6, No. 2, (2011), pp. 1576-1598.
European Search Report was dated May 11, 2018 by the European Patent Office for EP Application No. 14905884.4, which was filed on Nov. 12, 2014 and published as EP 3215542 on Sep. 13, 2017 (Applicant—Renmatix Inc.) (8 pages).
Office Action and Search Report was dated Jun. 25, 2018 by the Russian Patent Office for RU Application No. 2017120057, which was filed on Nov. 12, 2014 (Applicant—Renmatix, Inc.) (Original—4 pages//Translation 2 pages).

* cited by examiner

METHOD OF COALESCING A SUBSTANCE

CROSS-REFERENCE TO RELATED APPLICATIONS

This application is a U.S. National Phase Application of International Application No. PCT/US2014/065156, filed Nov. 12, 2014, which is herein incorporated by reference in its entirety.

BACKGROUND OF THE INVENTION

Lignocellulosic feedstocks (e.g. lignocellulosic biomass) comprise mainly cellulose, hemicelluloses, and lignin. Lignocellulosic feedstocks typically are obtained from renewable resources, such as agriculture, forests, and refineries associated therewith and are not considered to be food sources. In view of these aspects, lignocellulosic feedstocks are considered desirable for the production of biofuels, chemicals, and polymers.

Some existing methods for processing biomass delignify lignocellulosic feedstocks using solvents or other chemicals prior to hydrolyzing the cellulose. In such delignification processes, complex equipment typically is required and is expensive to operate because of solvent or chemical usage. In other existing processes, the conversion of lignocellulosic biomass in pre-treatment or hydrolysis steps takes place in the presence of lignin without significant or any delignification steps, and high temperatures typically are employed. At such temperatures, the lignin can be in a glassy state, and, upon cooling, the lignin can agglomerate or coalesce into one or more large masses that are difficult to work with. Additionally, without suitable control of the conditions upon cooling (e.g., temperature and agitation), the apparatuses employed can also foul, requiring the biomass processing operations to be shut down for cleaning.

There continues to be a need for providing an improved method of coalescing a substance (e.g., lignin derived from a lignocellulosic biomass) into a form that is easier to manage and without substantially fouling the equipment employed.

BRIEF SUMMARY OF THE INVENTION

In an aspect, the invention provides a method of coalescing a substance comprising providing a first mixture comprising a substance, agitating at least a portion of the first mixture under turbulent conditions for a first time period thereby causing particles comprising the substance to collide and form into larger particles.

DETAILED DESCRIPTION OF THE INVENTION

The invention provides a method comprising providing at a first temperature a first mixture comprising a substance wherein the first temperature is above about 60° C., and agitating at least a portion of the first mixture under turbulent conditions for a first time period at the first temperature, thereby causing particles comprising the substance having a first average size to collide and form into larger particles having a second average size, thereby forming a second mixture.

In some embodiments, the inventive method is conducted in a manner such that one of the following conditions is satisfied: (i) the agitating is performed substantially in the absence of enzymes, (ii) the agitating is performed in the presence of one or more enzymes under conditions that would be insufficient for the one or more enzymes to hydrolyze a significant portion of a substrate (e.g., a saccharide), whether or not the substrate is present.

In accordance with embodiments of the invention, the invention provides a method for coalescing a substance that is provided in a first mixture. In some embodiments, in addition to the substance to be coalesced, the first mixture further comprises a compound selected from the group consisting of cellulose, glucose, gluco-oligosaccharides, and any combination thereof. In some embodiments, the first mixture comprises cellulose. The compound selected from the group of cellulose, glucose, gluco-oligosaccharides, and any combination thereof, when present, can be present in any suitable amount. In a some embodiments, the compound is present in an amount of at least about 20 wt % (e.g., at least about 25 wt %, at least about 30 wt %, at least about 40 wt %, at least about 50 wt %, at least about 60 wt %, at least about 70 wt %, at least about 80 wt %, or at least about 90 wt %), based on the weight of the first mixture on a dry basis.

As used herein, "on a dry basis" indicates a weight measured substantially without water (e.g., less than about 1%, less than about 0.5%, less than about 0.1%, less than about 0.05%, or about 0% of water by weight, based on the total weight of the composition or mixture).

The first mixture can be obtained in any suitable manner. For example, the first mixture can be obtained by processing a feedstock comprising the substance. However, in keeping with some embodiments of the invention, the first mixture typically is not produced by a process selected from the group consisting of sulfite pulping, Kraft pulping, soda pulping, acid hydrolysis, enzymatic hydrolysis, organosolv pulping, and any combination thereof. In further keeping with aspects of the invention, in some embodiments the first mixture may be substantially devoid of a cooking liquor (e.g., does not comprise pulping liquor, such as black liquor and/or sulfite liquor). As used herein, "black liquor" refers to the waste product of the Kraft process when digesting pulpwood into paper pulp removing lignin, hemicelluloses, and other extractives from wood to free the cellulose fibers. As used herein, "sulfite liquor" refers to the spent cooking liquor from the sulfite pulping process.

As used herein, "substantially devoid of a cooking liquor" refers to a first mixture that contains less than about 5 wt % cooking liquor (e.g., black liquor and/or sulfite liquor), for example, less than about 4 wt %, less than about 3 wt %, less than about 2 wt %, less than about 1 wt %, less than about 0.5 wt %, or less than about 0.1 wt % by weight cooking liquor is present in the first mixture. In some embodiments, the first mixture does not comprise cooking liquor. In some embodiments, the first mixture does not comprise black liquor. In some embodiments, the first mixture does not comprise sulfite liquor. However, in some embodiments, the first mixture can comprise a substance that has been separated from a cooking liquor (e.g., lignin that has been separated from black liquor and/or sulfite liquor).

The substance can be any suitable substance that can be coalesced under turbulent conditions. In some embodiments, the substance is or comprises lignin, which can be derived from any suitable source (e.g., biomass, such as lignocellulosic biomass). As used herein, "biomass" refers to any renewable energy source generally comprising carbon-based biological material derived from living or recently-living organisms. The biomass can be from a virgin source (e.g., a forest, woodland, or farm) and/or a by-product of a processed source (e.g., off-cuts, bark, and/or sawdust from a paper mill or saw mill, sugarcane bagasse, corn stover, palm oil industry residues, branches, leaves, roots, and/or hemp). A lignocellulosic biomass is a plant biomass containing cellulose, hemicelluloses, and lignin from a variety of sources, including, without limitation (1) agricultural residues (including corn stover and sugarcane bagasse), (2) dedicated energy crops, (3) wood residues (including sawmill and paper mill discards), and (4) municipal waste (construction waste, used or discarded paper, cardboard, etc.), and their constituent parts including without limitation, lignocellulose biomass itself, lignin, $C_6$ saccharides (including cellulose, cellobiose, $C_6$ oligosaccharides, $C_6$ monosaccharides, and $C_5$ saccharides (including hemicellulose, $C_5$ oligosaccharides, and $C_5$ monosaccharides). In an embodiment, the first mixture further comprises cellulose in addition to the substance.

In accordance with embodiments of the invention, the substance (e.g., lignin) may be chemically bound to cellulose or free (i.e., not chemically bound to cellulose). In some embodiments, the substance is or comprises lignin wherein a substantial portion of the lignin, prior to the agitating step, is not chemically bound to cellulose. The amount of lignin bound to cellulose can be determined using any suitable method, for example, by an extraction method. For example, the amount of lignin bound to cellulose can be determined by extraction with a solution of 4 vol % water in dioxane, and the amount of lignin that is extracted can be compared to the total amount of lignin originally present, as measured by a suitable method, for example, NREL/TP-510-42618 (hereby incorporated by reference in its entirety).

As used herein, "a substantial portion of lignin" means that at least about 50 wt % of the lignin is not chemically bound to cellulose, for example, at least about 60 wt %, at least about 70 wt %, at least about 75 wt %, at least about 80 wt %, at least about 85 wt %, at least about 90 wt %, at least about 95 wt %, at least about 96 wt %, at least about 97 wt %, at least about 98 wt %, or at least about 99 wt % or more of the lignin, relative to the total amount of lignin present as measured by any suitable method (e.g., NREL/TP-510-42618), is not chemically bound to cellulose.

In certain aspects, the substance is or comprises one or more polymers. In some embodiments, the one or more polymers are derived from polymer precursors (e.g., monomers or other polymerizable compounds) originating from lignocellulosic feedstocks. In some embodiments, the substance comprises a furan-based polymer (e.g., polyfuran-type polymer). Illustrative polymer precursors include any suitable polymer precursors (and derivatives thereof), including, for example, those that can be obtained from C5 and/or C6 sugar streams (e.g., furfural, hydoxymethylfurfural, 2,5-furandicarboxylic acid, 2,5-bis(hydroxymethyl) furan, 2,5-furandicarboxylic acid-methyl ester, and the like, and compounds that can react, e.g., via aldol condensations, Diels-Alder reactions, radical reactions, aromatic substitutions, etc.).

The first mixture is provided at a first temperature, which is any suitable temperature. In general, the first temperature typically is above about 60° C., for example, above about 65° C., above about 70° C., above about 75° C., above about 80° C., above about 85° C., above about 90° C., above about 95° C., above about 100° C., above about 105° C., above about 110° C., above about 115° C., above about 120° C., above about 125° C., above about 130° C., above about 135° C., above about 140° C., above about 145° C., above about 150° C., above about 155° C., above about 160° C., above about 165° C., above about 170° C., above about 175° C., above about 180° C., above about 185° C., above about 190° C., above about 195° C., above about 200° C., above about 205° C., above about 210° C., above about 215° C., above about 220° C., above about 225° C., above about 230° C., above about 235° C., above about 240° C., above about 245° C., above about 250° C., above about 255° C., above about 260° C., above about 265° C., above about 270° C., above about 275° C., above about 280° C., above about 285° C., above about 290° C., above about 295° C., above about 300° C., above about 305° C., above about 310° C., above about 315° C., above about 320° C., above about 325° C., above about 335° C., above about 340° C., above about 345° C., or above about 350° C.

While the maximum temperature for the first temperature is not particularly limited, it is desirable that the maximum temperature is such that the substance does not degrade (e.g., at all or to a significant extent). The maximum temperature typically can be, in an embodiment, about 360° C. or less, e.g., about 355° C. or less, about 350° C. or less, about 345° C. or less, about 340° C. or less, about 335° C. or less, about 330° C. or less, about 325° C. or less, about 320° C. or less, about 315° C. or less, about 310° C. or less, about 305° C. or less, about 300° C. or less, about 295° C. or less, about 290° C. or less, about 285° C. or less, about 280° C. or less, about 275° C. or less, about 270° C. or less, about 265° C. or less, about 260° C. or less, about 255° C. or less, about 250° C. or less, about 245° C. or less, about 240° C. or less, about 235° C. or less, about 230° C. or less, about 225° C. or less, about 220° C. or less, about 215° C. or less, about 210° C. or less, about 205° C. or less, about 200° C. or less, about 195° C. or less, about 190° C. or less, about 185° C. or less, about 180° C. or less, about 175° C. or less, about 170° C. or less, about 165° C. or less, about 160° C. or less, about 155° C. or less, about 150° C. or less, about 145° C. or less, about 140° C. or less, about 135° C. or less, about 130° C. or less, about 125° C. or less, about 120° C. or less, about 115° C. or less, about 110° C. or less, about 105° C. or less, about 100° C. or less, about 95° C. or less, about 90° C. or less, about 85° C. or less, about 80° C. or less, about 75° C. or less, about 70° C. or less, about 65° C. or less.

These lower and upper limits with respect to the temperatures of the first mixture can be used in any combination to define a close-ended range, or can be used as an open-ended range, to describe the temperature range of the first mixture.

Agitation can be carried out in any suitable vessel. For example, agitation can be carried out in a tank, a flash vessel, a cyclone, a hydrocyclone, a reactor, a heat exchanger, a tube (e.g., pipe), or any combination thereof. Agitation can take place by any suitable method, including stirring (e.g., mechanical stirring), shearing, shaking, static mixing, whisking, mashing, vibrating, circulating, flowing, boiling, spraying, injecting a fluid (e.g., water, organic solvent (e.g., ethanol), slurry, carbon dioxide, sulfur dioxide, nitrogen, oxygen, hydrogen, helium, argon, or any combination thereof), or any combination thereof. As used herein, a "flash vessel" is a vessel in which vapor is disengaged from a fluid, typically operated at a pressure below the saturated vapor pressure of the fluid in the vessel. As used herein, "fluid" can include liquids, gases, or combinations thereof, with or without any solids contained therein. In other words, as used herein, a slurry (a mixture of solids in liquid, optionally further containing a gas) is considered a fluid.

In some embodiments, sequential agitation can be performed on the first mixture in one or more vessels operating at one or more first temperatures. For example, the agitation can be performed sequentially at two different temperatures: agitating a first temperature of, e.g., about 170 to about 250° C., followed by agitating at a first temperature of, e.g., about 80° C. to about 160° C. In some embodiments, the agitation can be performed sequentially at three different temperatures: agitating at a first temperature of, e.g., about 180° C. to about 260° C., followed by agitating at a first temperature of, e.g., about 130° C. to about 170° C., followed by agitating at a first temperature of, e.g., about 60° C. to about 105° C. The number of sequential agitations can be any suitable number, including two, three, four, five, six, seven, eight, nine, or ten, though the maximum number of sequential agitations is not particularly limiting. The temperature range of each sequential agitation can be described by any of the first temperature ranges disclosed hereinabove. In some embodiments, sequential agitation can be performed in the same vessel (e.g., a single vessel or tank). In some embodiments, sequential agitation can be performed in different vessels (e.g., a first agitation in a first vessel, and a second agitation in a second vessel). In some embodiments, sequential agitation is carried out in one or more flash vessels (e.g., flash tank, flash drum, hydrocyclone, cyclone, or any combination thereof, etc.). In some embodiments, sequential agitation is carried out in one or more tanks, optionally in combination with one or more flash vessels. In some embodiments, sequential agitation can be performed in one or more vessels operating at one or more first temperatures. For example, agitation can first be performed in one vessel at first temperature, and then fed into the same vessel or a different vessel and agitated at a same or different first temperature. In embodiments where sequential agitation is performed in a single vessel, the mixture is recycled to the same vessel after the first agitation.

In some embodiments, sequential agitations can occur in series (e.g., without any substantial interruption). In some embodiments, one or more sequential agitations can be followed by one or more separations prior to a subsequent agitation (i.e., in which the separation is considered an interruption). In some embodiments, each sequential agitation can be followed by a separation prior to a subsequent agitation. The number of separations between sequential agitations can be any suitable number, including one, two, three, four, five, or six. Typically the number of separations between sequential agitations is one. The total number of separations in a sequential agitation is typically the same as or less than the total number of sequential agitations. For example, when the total number of sequential agitations comprises three sequential agitations, the total number of separations can be three, two, or one. However, in some embodiments, the total number of separations can be greater than the number of sequential agitations. In some embodiments, there are no separations between sequential agitations. For example, agitation in a stirred tank can be intermittently stopped, slowed down, and/or brought to a non-turbulent agitation level. As used herein, "intermittent" means that the agitation is stopped, slowed down, and/or brought to a non-turbulent agitation level at least once during the first time period. In some embodiments where agitation is intermittently stopped, the agitation typically is not stopped for an amount of time that would be sufficient for the substance present in the stirred fluid to at least partially settle to the bottom of the tank.

In some embodiments, the first temperature is at or above the glass transition temperature (Tg) of the substance. The Tg refers to the temperature at which an amorphous material changes from a brittle, vitreous state to a plastic state. The Tg is dependent upon the composition of the material being tested, including the moisture content, the extent of annealing, and the pressure exerted on the material. Glass transition temperatures may be measured using differential scanning calorimetry (DSC). As used herein, the Tg of a substance refers to the Tg of the purified form of the substance, not the Tg of a mixture (e.g., the first mixture) comprising the substance. In other words, even though the substance (e.g., lignin) is potentially present in the first mixture along with one or more other compounds, the Tg should be measured for the purified substance itself. In this regard, references to a given temperature being above or below the Tg of the substance in the first mixture refer to the Tg of the substance in purified form, whether or not the substance is actually present in pure form in the first mixture. For example, in embodiments where the substance is or comprises lignin, the lignin is first extracted from the first mixture using the following protocol: the first mixture is dried to remove water, and the resulting solids are extracted with an aqueous solution of 1 wt % NaOH in water. The solids to solvent ratio was kept constant at about 1 to about 10, and the extraction is performed at about 20° C. at about 1 atm stirring constantly for about 3 hours. After extraction, the resulting mixture is separated by centrifugation, and the centrate acidified to a pH of about 2 to precipitate lignin. The precipitated lignin is washed to remove acid and dried at about 45° C. to constant weight under vacuum. The precipitated (i.e., purified) lignin is then subjected to Tg analysis. If the first mixture contains proteins, which can affect the Tg measurement, then instead of aqueous alkaline extraction, the solids from the first mixture instead are extracted with dioxane/water solution (96% dioxane by volume), which preferentially extracts the lignin and leaves behind protein and other impurities (e.g., sugars). The dioxane/water extraction technique is similar to the aqueous alkaline extraction procedure, except instead of acid precipitation, the lignin is recovered by evaporating the centrate to constant weight under vacuum at about 40° C. In embodiments where the substance is a polymer (e.g., not necessarily lignin), the polymer is purified from the first mixture by a suitable purification technique prior to subjecting the purified polymer to Tg analysis.

An illustrative protocol for measuring the Tg of lignin using DSC is as follows: purified lignin samples (about 5 mg) are weighed in duplicate into pre-weighed pans with lids and placed in a vacuum oven at 40° C. overnight. This is to ensure dryness, as the presence of water has a significant impact on the apparent glass transition temperature. On removing the pans from the oven, the pans are immediately hermetically sealed with a sample press and left to cool. The weight of the pan containing lignin is recorded and the pan tare weight subtracted from this to provide the weight of dry lignin in the sealed pan. Pans are loaded into the DSC and run on the following program: (1) ramp at 5° C./min to 105° C.; (2) isothermal at 105° C. for 40 min; (3) ramp at 50° C./min to 200° C.; and (4) ramp 10° C./min to 250° C.

In some embodiments, the first temperature is at least about the Tg of the substance present in the first mixture. In the case of lignin, the Tg typically is, e.g., in the range of about 60° C. to about 150° C. In some embodiments, the first temperature is at least about 60° C. In some embodiments, the first temperature is at least about 65° C. In some embodiments, the first temperature is at least about 80° C. In some embodiments, the first temperature is at least about 100° C., at least about 120° C., or at least about 130° C. Other suitable first temperatures are disclosed elsewhere herein.

In some embodiments, the first temperature is at least about the Tg of a polymer present in the first mixture. Polymer Tgs can be measured experimentally or found in the literature.

During the agitating, the pressure exerted on the first mixture can be any suitable pressure. For example, the pressure can be ambient pressure (e.g., about 1 bar), or the pressure can be above ambient pressure. In some embodiments, the pressure is at least about 1 bar, e.g., at least about 2 bar, at least about 5 bar, at least about 10 bar, at least about 20 bar, at least about 30 bar, at least about 40 bar, at least about 50 bar, at least about 60 bar, at least about 80 bar, at least about 100 bar, at least about 150 bar, at least about 200 bar, or at least about 250 bar. Alternatively, or in addition, the pressure can be less than about 300 bar, e.g., less than about 275 bar, less than about 225 bar, less than about 175 bar, less than about 125 bar, less than about 90 bar, less than about 70 bar, less than about 50 bar, less than about 40 bar, less than about 30 bar, less than about 20 bar, less than about 10 bar, less than about 5 bar, or less than about 2 bar. Any two of the foregoing endpoints can be used to define a close-ended range, or can be used singly to define an open-ended range.

The first mixture is agitated for a first time period at the first temperature. Although the method of agitation is not particularly limited and can be conducted using any suitable method, in keeping with the invention, the first mixture can be agitated in a manner such that at least a portion of the first mixture is agitated under turbulent conditions. Illustrative methods of agitation include stirring, shearing, shaking, circulating, flowing, or any combination thereof. Other suitable methods of agitation are disclosed elsewhere herein. In some embodiments, agitation can be intermittently stopped. In such embodiments, the time period during which agitation is stopped typically is not sufficient for a significant portion of the mixture to settle. In such embodiments, the first time period can include the time during which the agitation is stopped. In other words, agitation can be started at t=0 and stopped intermittently until t=x, provided that the stopped periods do not allow a significant portion of the mixture to settle, and the "first time period" will be the full time period between t=0 and t=x. As used herein, a "significant portion" means at least about 10% by weight, e.g., at least about 20%, at least about 30%, at least about 40%, at least about 50%, at least about 60%, at least about 70%, at least about 80%, or at least about 90% by weight.

As understood by one of ordinary skill in the art, turbulent conditions refer to a state in which inertial forces dominate over viscous forces. One example of turbulent conditions is a fluid flow pattern having eddies of multiple scales interacting to produce a high degree of mixing within a fluid body.

It is well established that turbulence in a system can be described using the Reynolds number (Re), wherein laminar flow (e.g., characterized by smooth, constant fluidic motion) occurs at low Re and turbulent flow (e.g., characterized by eddies, vortices, and other flow instabilities) occurs at high Re. Reynolds numbers are defined for various systems in which a fluid is in relative motion to a surface. These definitions generally account for the density and viscosity of the fluid, as well as the velocity of the fluid and dimension/geometry of the system. By way of example, the Re is calculated differently in the following systems: flow in a pipe, flow in a wide duct, flow in an open channel, flow around airfoils, and flow for an object (e.g., sphere, oblong-shaped) in a fluid. The differences arise, in part, due to the different geometries of the systems (e.g., flow of a fluid in a pipe versus a fluid in a stirred vessel). In general, the Reynolds number can be defined as follows:

$$Re = \frac{\rho v L}{\mu}$$

where $\rho$ is the density (kg/m$^3$) of the fluid, v is the mean velocity (m/s) of the object relative to the fluid, L is the characteristic linear dimension (m) (e.g., travelled length of the fluid), and p is the dynamic viscosity (Pa·s) of the fluid. In general, the Reynolds number in an agitated vessel can be defined as follows:

$$Re = \frac{\rho N D^2}{\mu}$$

where D is the diameter of the agitator (e.g., impeller) (m), N is the rotational speed (rps) of the agitator, $\rho$ is the density (kg/m$^3$) of the fluid, and $\mu$ is the viscosity (Pa·s) of the fluid.

As appreciated by one of ordinary skill in the art, the Re can vary within a single system. For example, the Re of fluid flowing in a pipe is considered to be generally more uniform than the Re of a fluid being agitated in a tank. By way of further illustration, boiling a mixture during the agitation gives rise to bubbles flowing through the fluid within the mixture. Accordingly, the Re at the interface of the bubbles and the fluid in the mixture may be different than the Re at another point in the mixture (e.g., the Re of the bulk fluid). Similarly, the Re at the interface of the fluid in a mixture and an instrument used to agitate the mixture (e.g., an impeller, a blade, a paddle, a rod, and the like) while in a mixing tank may be different than the Re of the bulk fluid in the mixing tank not at the interface.

In view of the foregoing, the manner in which at least a portion of the first mixture is agitated under turbulent conditions is not particularly limited. In some embodiments, the first mixture is boiling during the agitating.

As used herein, "turbulent" conditions/flow/mixing typically refers to Reynolds numbers greater than about 4000 while Reynolds numbers less than about 2000 typically refer to laminar conditions/flow. Reynolds numbers of about 2000 to about 4000 can describe a transitional region between laminar conditions and turbulent conditions, wherein turbulent conditions may exist. In some embodiments, conditions are "turbulent" when the Reynolds number is above 2500, for example, above 2750, above 3000, above 3250, above 3500, above 3750, above 4000, above 4250, above 4500, above 4750, or above 5000 for at least a portion of the fluid (e.g., first mixture). In some embodiments, the turbulent conditions comprise agitating at a Reynolds number greater than 2500. In some embodiments, the turbulent conditions comprise agitating at a Reynolds number greater than 4000.

As used herein, "at least a portion of the fluid" refers to at least about 1 vol % or more of the fluid being agitated under turbulent conditions, for example, about 5 vol % or more, about 10 vol % or more, about 15 vol % or more, about 20 vol % or more, about 25 vol % or more, about 30 vol % or more, about 35 vol % or more, about 40 vol %, about 45 vol % or more, about 50 vol % or more, about 55 vol % or more, about 60 vol % or more, about 65 vol % or more, about 70 vol % or more, about 75 vol % or more, about 80 vol % or more, about 85 vol % or more, about 90 vol % or more, about 95 vol % or more, or about 100 vol % of the fluid being agitated under turbulent conditions. The maximum portion of the first mixture which undergoes turbulent conditions is not particularly limited.

In a preferred embodiment, a substantial portion of the first mixture exhibits turbulent conditions during the agitating. As used herein, "substantial portion" refers to a majority of the first mixture experiencing turbulent conditions. For example, at least about 51 vol % or more of the first mixture exhibits turbulent conditions during the agitation, e.g., at least about 55 vol % or more, at least about 60 vol % or more, at least about 75 vol % or more, at least about 90 vol % or more, at least about 95 vol % or more, at least about 96 vol % or more, at least about 97 vol % or more, at least about 98 vol % or more, or at least about 99 vol % or more of the first mixture exhibits turbulent conditions during the agitation.

The first time period is any suitable period of time. While the first time period is not particularly limited, it is an amount of time sufficient to cause particles comprising the substance to collide and form into larger particles having a second average size. In some embodiments, the first time period is less than about 6 hours, e.g., less than about 5.5 hours, less than about 5 hours, less than about 4.5 hours, less than about 4 hours, less than about 3.5 hours, less than about 3 hours, less than about 2.5 hours, less than about 2 hours, less than about 1.5 hours, or less than 1 hour. Alternatively, or in addition to, the first time period typically is about 1 min or more, e.g., about 5 min or more, about 10 min or more, about 15 min or more, about 20 min or more, about 25 min or more, about 30 min or more, about 35 min or more, about 40 min or more, about 45 min or more, about 50 min or more, about 55 min or more, or about 60 min or more. These lower and upper limits with respect to the first time period can be used in any combination to describe the first time period, or can be used singly to describe an open-ended range for the first time period. In some embodiments, the first time period is about 1 min to about 60 min. In some embodiments, the first time period can be at least about 10 hours, at least about 24 hours, or at least about 48 hours.

The substance in the first mixture has a first average size and subsequently is formed into particles having a larger, second average size. The first average size is any suitable size. While the maximum first average particle size is not particularly limited, the first average size typically is about 200 µm or less, e.g., about 190 µm or less, about 180 µm or less, about 170 µm or less, about 160 µm or less, about 150 µm or less, about 140 µm or less, about 130 µm or less, about 120 µm or less, about 110 µm or less, about 100 µm or less, about 90 µm or less, about 80 µm or less, about 70 µm or less, about 60 µm or less, about 50 µm or less, about 40 µm or less, about 30 µm or less, or about 20 µm or less. In some embodiments, the first average size is less than about 200 µm.

Alternatively, or in addition, the first average size is about 10 µm or more, e.g., about 20 µm or more, about 30 µm or more, about 40 µm or more, about 50 µm or more, about 60 µm or more, about 70 µm or more, about 80 µm or more, about 90 µm or more, about 100 µm or more, about 110 µm or more, about 120 µm or more, about 130 µm or more, about 140 µm or more, about 150 µm or more, about 160 µm or more, about 170 µm or more, about 180 µm or more, or about 190 µm or more. These lower and upper limits with respect to the first average size can be used in any combination to describe the first average size, or can be used singly to describe an open-ended range for the first average size.

In accordance with the invention, the substance is formed into particles having a second average size that is larger than the first average size. The second average size is any suitable size. While not being particularly limited, the second average size is larger than the first average size. The second average size typically is about 200 µm or more, e.g., about 225 µm or more, about 250 µm or more, about 275 µm or more, about 300 µm or more, about 325 µm or more, about 350 µm or more, about 375 µm or more, about 400 µm or more, about 425 µm or more, about 450 µm or more, about 475 µm or more, about 500 µm or more, about 525 µm or more, about 550 µm or more, about 575 µm or more, about 600 µm or more, about 625 µm or more, about 650 µm or more, about 675 µm or more, about 700 µm or more, about 725 µm or more, about 750 µm or more, about 775 µm or more, about 800 µm or more, about 825 µm or more, about 850 µm or more, about 875 µm or more, about 900 µm or more, about 925 µm or more, about 950 µm or more, about 975 µm or more, about 1000 µm or more, about 1025 µm or more, about 1050 µm or more, about 1100 µm or more, about 1125 µm or more, about 1150 µm or more, about 1175 µm or more about 1200 µm or more, about 1225 µm or more, about 1250 µm or more, about 1275 µm or more, about 1300 µm or more, about 1325 µm or more, about 1350 µm or more, about 1375 µm or more, about 1400 µm or more, about 1425 µm or more, about 1450 µm or more, about 1475 µm or more, about 1500 µm or more, about 1750 µm or more, about 2000 µm or more, about 2250 µm or more, about 2500 µm or more, about 2750 µm or more, about 3000 rim or more, about 3250 µm or more, or about 3500 µm or more. In some embodiments, the second average size is greater than about 200 microns.

While the maximum second average particle size is not particularly limited, the second average size typically is about 3500 µm or less, e.g., about 3250 µm or less, about 3000 µm or less, about 2750 µm or less, about 2500 µm or less, about 2250 µm or less, about 2000 µm or less, about 1750 µm or less, about 1500 µm or less, about 1475 µm or less, about 1450 µm or less, about 1425 µm or less, about 1400 µm or less, about 1375 µm or less, about 1350 µm or less, about 1325 µm or less, about 1300 µm or less, about 1275 µm or less, about 1250 µm or less, about 1225 µm or less, about 1200 µm or less, about 1175 µm or less, about 1150 µm or less, about 1125 µm or less, about 1100 µm or less, about 1075 µm or less, about 1050 µm or less, about 1025 µm or less, about 1000 µm or less, about 975 µm or less, about 950 µm or less, about 925 µm or less, about 900 µm or less, about 875 µm or less, about 850 µm or less, about 825 µm or less, about 800 µm or less, about 775 µm or less, about 750 µm or less, about 725 µm or less, about 700 µm or less, about 675 µm or less, about 650 µm or less, about 625 µm or less, about 600 µm or less, about 575 µm or less, about 550 µm or less, about 525 µm or less, about 500 µm or less, about 475 µm or less, about 450 µm or less, about 425 µm or less, about 400 µm or less, about 375 µm or less, about 350 µm or less, about 325 µm or less, about 300 µm or less, or about 250 µm or less. These lower and upper limits with respect to the second average size can be used in any combination to describe the second average size, or can be used singly to describe an open-ended range for the second average size.

In an aspect, the larger particles formed from the second mixture contain at least about 80 wt % of the substance on a dry basis. In a preferred embodiment, the larger particles contain at least about 85 wt % of the substance on a dry basis, more preferably at least about 90 wt %, at least about 95 wt %, at least about 96 wt %, at least about 97 wt %, at least about 98 wt %, or at least about 99 wt % on a dry basis. In other words, the larger particles are enriched in the substance.

In some embodiments, the inventive method further comprises removing at least a portion of the larger particles of the substance from the second mixture while the temperature is at or above the glass transition temperature of the substance. In some embodiments, the inventive method further comprises removing at least a portion of the larger particles of the substance from the second mixture while the temperature is below the glass transition temperature of the substance. The larger particles of the substance can be separated using any suitable method (e.g., solid liquid separation, filtration (e.g., filter press, belt filter, and the like), gravity separation, centrifugal separation, centripetal separation, screening, or a combination of any of the foregoing methods). An illustrative method of separating particles based on size using centripetal or centrifugal separation is a hydrocyclone (or "hydroclone" or "cyclone"), which is a device to classify, separate, or sort particles in a liquid and/or gas suspension based on the ratio of their centripetal force to fluid resistance. This ratio is high for dense (where separation by density is required) and coarse (where separation by size is required) particles, and low for light and fine particles. A hydrocyclone typically will have a cylindrical section at the top where liquid is fed tangentially, and a conical base. The angle, and hence length of the conical section, plays a role in determining the separation characteristics.

In accordance with some embodiments of the invention, the method is conducted under conditions such that enzymatic hydrolysis of the substance substantially does not occur during agitation of the first mixture. By "substantially does not occur," it is meant that no more than about 1% by weight (on a dry basis) of the substance undergoes an enzymatic hydrolysis reaction. Preferably less than about 0.5% by weight, and more preferably, less than about 0.1%, by weight of the substance undergoes an enzymatic hydrolysis reaction (on a dry basis).

In some aspects, agitation of the first mixture is performed substantially in the absence of enzymes capable of hydrolyzing a substrate. In another aspect, one or more enzymes capable of hydrolyzing a substrate are present during the first time period, but the conditions during the agitation step are such that a significant portion of a substrate is not hydrolyzed. As used herein relative to enzymatic hydrolysis of a substrate, a "significant portion" means at least about 10% by weight of the substrate, e.g., at least about 20%, at least about 30%, at least about 40%, at least about 50%, at least about 60%, at least about 70%, at least about 80%, or at least about 90% by weight of the substrate. In one aspect, an enzymatic substrate may not be present even though one or more enzymes are present during the agitation. Alternatively, one or more enzymes may be present along with one or more substrates, but the reaction conditions during the agitation are unfavorable for an enzymatic hydrolysis of the substrate to substantially occur. For example, the temperature, pH, or ionic strength of the liquid may be insufficient to hydrolyze a significant portion of the substrate using enzymes.

The substrate, when present, can be any suitable substrate that is hydrolysable by one or more enzymes. In some embodiments, the substrate is or comprises a saccharide. In a preferred embodiment the saccharide is selected from the group consisting of hemicelluloses, cellulose, and a combination thereof. In this context, it is provided in an embodiment that the first mixture is agitated under a condition insufficient to hydrolyze a significant portion of at least one of hemicelluloses and cellulose, whether or not present in the mixture.

The inventive method can further comprise, prior to providing the first mixture, supplying a feedstock comprising the substance and subjecting the feedstock at a second temperature of at least about 130° C. for a second time period to a first fluid comprising hot compressed water or supercritical water, thereby forming a third mixture that is the same as or different from the first mixture.

The feedstock can be any suitable feedstock comprising the substance to be coalesced. Suitable feedstocks include lignocellulosic feedstock, cellulosic feedstock, hemicellulosic feedstock, starch-containing feedstocks, etc. The lignocellulosic feedstock can be from any lignocellulosic biomass, such as plants (e.g., duckweed, annual fibers, etc.), trees (softwood or hardwood, e.g., spruce (Norwegian spruce), elm, oak, aspen, pine, poplar, willow, or *eucalyptus*), bushes, grass (e.g., *miscanthus*, switchgrass, rye, reed canary grass, giant reed, or sorghum), dedicated energy crops, municipal waste (e.g., municipal solid waste), and/or a by-product of an agricultural product (e.g., corn, sugarcane, sugar beets, pearl millet, grapes, rice, straw). Suitable feedstocks may also include the constituent parts of any of the aforementioned feedstocks, including, without limitation, lignin, C6 saccharides (including cellulose, cellobiose, C6 oligosaccharides, and C6 monosaccharides), C5 saccharides (including hemicellulose, C5 oligosaccharides, and C5 monosaccharides), and mixtures thereof. In some embodiments, the feedstock comprises cellulose.

The second temperature is any suitable temperature. While not wishing to be bound to any particular theory, it is believed that the second temperature is sufficient to keep the water in liquid form or in a supercritical state under high pressure. A supercritical fluid is a fluid at a temperature above its critical temperature and at a pressure above its critical pressure. A supercritical fluid exists at or above its "critical point," the point of highest temperature and pressure at which the liquid and vapor (gas) phases can exist in equilibrium with one another. Above critical pressure and critical temperature, the distinction between liquid and gas phases disappears. A supercritical fluid possesses approximately the penetration properties of a gas simultaneously with the solvent properties of a liquid. Accordingly, supercritical fluid extraction has the benefit of high penetrability and good solvation.

For pure water, reported critical temperatures and pressures include: a critical temperature of about 374.2° C., and a critical pressure of about 221 bar. Carbon dioxide has a critical point of about 31.degree. C. and about 72.9 atmospheres (about 1072 psig). Ethanol has a critical point of about 243.degree. C. and about 63 atmospheres. Methanol has a critical point of about 239.degree. C. (512.8 K) and about 1174.0 psia (80.9 bar). The critical point for other alcohols can be ascertained from the literature or experimentally. The term "hot compressed water" is used herein for water that is at or above 100° C. (but less than 374.2° C.) and under a pressure sufficient to keep all of the water in liquid form.

As used herein, a fluid which is "supercritical" (e.g. supercritical water) indicates a fluid which would be supercritical if present in pure form under a given set of temperature and pressure conditions. For example, "supercritical water" indicates water present at a temperature of at least about 374.2° C. and a pressure of at least about 221 bar, whether the water is pure water, or present as a mixture (e.g. water and ethanol, water and $CO_2$, etc). Thus, for example, "a mixture of hot compressed water and supercritical carbon dioxide" indicates a mixture of water and carbon dioxide at a temperature and pressure above that of the critical point for carbon dioxide but below the critical point for water (and under a sufficient pressure to keep the water in liquid form), regardless of whether the supercritical phase contains water and regardless of whether the water phase contains any carbon dioxide. For example, a mixture of hot compressed water and supercritical $CO_2$ may have a temperature of about 250° C. to about 280° C. and a pressure of at least about 225 bar (22,500 kPa).

In some embodiments, the second temperature is sufficient to facilitate the removal of at least a portion (e.g., at least about 10 wt %, at least about 20 wt %, at least about 30 wt %, at least about 40 wt %, at least about 50 wt %, at least about 60 wt %, at least about 70 wt %, at least about 80 wt %, at least about 90 wt %, at least about 95 wt %, at least about 99 wt %, or at least about 100 wt %, on a dry basis) of hemicellulose from a biomass feedstock comprising lignin.

The second temperature typically is about 130° C. or more, e.g., about 135° C. or more, 140° C. or more, 145° C. or more, 150° C. or more, 155° C. or more, 160° C. or more, 165° C. or more, 170° C. or more, 175° C. or more, 180° C. or more, 185° C. or more, 190° C. or more, 195° C. or more, 200° C. or more, 205° C. or more, 210° C. or more, 215° C. or more, 220° C. or more, 225° C. or more, 230° C. or more, 235° C. or more, 240° C. or more, 245° C. or more, 250° C. or more, 255° C. or more, 260° C. or more, 265° C. or more, 270° C. or more, 275° C. or more, 280° C. or more, 285° C. or more, 290° C. or more, 295° C. or more, 300° C. or more, 305° C. or more, 310° C. or more, 315° C. or more, 320° C. or more, 325° C. or more, 330° C. or more, 335° C. or more, 340° C. or more, 345° C. or more, 350° C. or more, 355° C. or more, 360° C. or more, 365° C. or more, 370° C. or more, 375° C. or more, 380° C. or more, 385° C. or more, 390° C. or more, 395° C. or more, 400° C. or more, 405° C. or more, 410° C. or more, 415° C. or more, 420° C. or more, 425° C. or more, 430° C. or more, 435° C. or more, 440° C. or more, 445° C. or more, or about 450° C. or more.

While the maximum temperature for the second temperature is not particularly limited, it is desirable that the maximum temperature is such that the substance does not degrade (e.g., at all or to a significant extent). The maximum temperature typically is about 460° C. or less, e.g., about 455° C. or less, about 450° C. or less, about 445° C. or less, about 440° C. or less, about 435° C. or less, about 430° C. or less, about 425° C. or less, about 420° C. or less, about 415° C. or less, about 410° C. or less, about 405° C. or less, about 400° C. or less, about 395° C. or less, about 390° C. or less, about 385° C. or less, about 380° C. or less, about 375° C. or less, about 370° C. or less, about 365° C. or less, about 360° C. or less, about 355° C. or less, about 350° C. or less, about 345° C. or less, about 340° C. or less, about 335° C. or less, about 330° C. or less, about 325° C. or less, about 320° C. or less, about 315° C. or less, about 310° C. or less, about 305° C. or less, about 300° C. or less, about 295° C. or less, about 290° C. or less, about 285° C. or less, about 280° C. or less, about 275° C. or less, about 270° C. or less, about 265° C. or less, about 260° C. or less, about 255° C. or less, about 250° C. or less, about 245° C. or less, about 240° C. or less, about 235° C. or less, about 230° C. or less, about 225° C. or less, about 220° C. or less, about 215° C. or less, about 210° C. or less, about 205° C. or less, about 200° C. or less, about 195° C. or less, about 190° C. or less, about 185° C. or less, about 180° C. or less, about 175° C. or less, about 170° C. or less, about 165° C. or less, about 160° C. or less, about 155° C. or less, about 150° C. or less, about 145° C. or less, about 140° C. or less, or about 135° C. or less.

These lower and upper limits with respect to the second temperature can be used in any combination to describe the range of the second temperature, or can be used singly to describe an open-ended range.

In an embodiment, the second temperature is at least about 140° C. In another embodiment, the second temperature is at least about 160° C. In some embodiments, the second temperature is at least about 350° C., at least about 374° C., or at least about 450° C.

The pressure during the subjecting can be any suitable pressure. The pressure typically is sufficient to keep all of the water present in liquid form. For example, the pressure can be at least about 2 bar (200 kPa), e.g., at least about 3 bar (300 kPa), at least about 5 bar (500 kPa), at least about 10 bar (1000 kPa), at least about 15 bar (1500 kPa), at least about 20 bar (2000 kPa), at least about 30 bar (3000 kPa), at least about 40 bar (4000 kPa), at least about 50 bar (5000 kPa), at least about 70 bar (7000 kPa), at least about 90 bar (9000 kPa), at least about 100 bar (10,000 kPa), at least about 125 bar (12,500 kPa), at least about 150 bar (15,000 kPa), at least about 175 bar (17,500 kPa), at least about 200 bar (20,000 kPa), at least about 225 bar (22,500 kPa), at least about 250 bar (25,000 kPa), at least about 275 bar (27,500 kPa), or at least about 300 bar (30,000 kPa). Alternatively, or in addition, the pressure can be less than about 300 bar (30,000 kPa), e.g., less than about 275 bar (27,500 kPa), less than about 250 bar (25,000 kPa), less than about 225 bar (22,500 kPa), less than about 200 bar (20,000 kPa), less than about 175 bar (17,500 kPa), less than about 150 bar (15,000 kPa), less than about 125 bar (12,500 kPa), less than about 100 bar (10,000 kPa), less than about 90 bar (9000 kPa), less than about 80 bar (8000 kPa), less than about 60 bar (6000 kPa), less than about 50 bar (5000 kPa), less than about 40 bar (4000 kPa), less than about 30 bar (3000 kPa), less than about 20 bar (2000 kPa), less than about 15 bar (1500 kPa), less than about 10 bar (1000 kPa), less than about 5 bar (500 kPa), less than about 4 bar (400 kPa), less than about 3 bar (300 kPa), or less than about 2 bar (200 kPa). Any two of the foregoing endpoints can be combined to form a close-ended range, or can be used singly to define an open-ended range.

In some aspects, the method comprises pretreating the feedstock to reduce the size of the feedstock prior to subjecting the feedstock to the first fluid. The size reduction of the feedstock is conducted using any suitable method. In some embodiments, the size reduction of the feedstock is conducting by grinding, milling, steam explosion, or any combination thereof.

As used herein with respect to biomass, "steam exploding" means a thermomechanochemical process used to breakdown the structural components of the biomass aided by heat in the form of steam (thermo), shear forces due to the expansion of moisture (mechano), and hydrolysis of glycosidic bonds (chemical). In a reactor, steam under high pressure penetrates the lignocellulosic structures due to a pressure differential, or by convection or diffusion. The steam may also simply heat water already present within the interstitial spaces of the biomass itself, thereby forming hot water and/or steam in the interstitial spaces. In the case of steam, the steam condenses under the high pressure, thereby "wetting" the material (in the case of hot water, the material will already be "wetted"). The water in the biomass hydrolyzes the acid functionalities of the hemicellulose, forming free organic acids, such as acetic acid. Acid byproducts may also form, such as formic acid. The acids, in turn, catalyze the depolymerization of hemicellulose, releasing xylo-oligosaccharides and limited amounts of gluco-oligosaccharides. Under extreme conditions, the amorphous regions of cellulose may be hydrolyzed to some degree. Excessive conditions, i.e., high temperatures and pressures, however, can also promote the degradation of xylose to furfural and glucose to 5-hydroxymethyl furfural. The "wet" biomass is "exploded" when the pressure within the reactor is rapidly released. Several phenomena occur at this point. First, the condensed moisture within the structure evaporates instantaneously due to the sudden decrease in pressure. The expansion of the water vapor exerts a shear force on the surrounding structure. If this shear force is high enough, the vapor will cause the mechanical breakdown of the lignocellulosic structures.

In some embodiments, the feedstock is unfractionated biomass. In some embodiments, the feedstock is fractionated biomass. Accordingly, when the feedstock is fractionated biomass, typically at least a portion of at least one of hemicellulose and cellulose originally present in the biomass has been substantially removed. Typically, in fractionated biomass at least a portion of the hemicellulose originally present therein has been removed. As used herein, "substantially removed" refers to at least about 50 wt % of at least one of hemicellulose and cellulose being removed, e.g., at least about 60 wt %, at least about 75 wt %, at least about 90 wt %, at least about 95 wt %, at least about 96 wt %, at least about 97 wt %, at least about 98 wt %, or at least about 99 wt % of at least one hemicellulose and at least one cellulose being removed (on a dry basis). In some embodiments, fractionated biomass is defined as having at least about 10 wt %, e.g., at least about 20 wt %, at least about 30 wt %, or at least about 40 wt % (on a dry basis) of at least one of hemicellulose and cellulose originally present in the biomass being removed.

In some embodiments, the first mixture comprises or is fractionated biomass in which at least a portion of hemicellulose has been removed (as compared to the original composition of the starting biomass). In some embodiments, the first mixture comprises or is fractionated biomass in which at least a portion of cellulose has been removed (as compared to the original composition of the starting biomass). In some embodiments, the first mixture comprises or is fractionated biomass in which portions of both hemicellulose and cellulose originally present in the starting biomass have been removed.

In accordance with some embodiments of the invention, the feedstock comprising the substance is subjected to a first fluid for a second time period. The second time period can be any suitable time period and typically is sufficient to facilitate the removal of at least a portion of hemicellulose from a biomass feedstock at the second temperature. In an aspect, the second time period depends on the second temperature. Typically, the second time period is inversely proportional to the second temperature. For example, shorter time periods can be used with higher temperatures, whereas longer times can be used with lower temperatures. In accordance with certain embodiments, during the second time period a portion of the hemicellulose present is removed from a slurry of lignocellulosic biomass composed primarily of hemicellulose, cellulose, and lignin. The hemicellulose typically is hydrolyzed and solubilized into a C5 sugar stream comprising xylo-oligosaccharides and xylose.

The second time period is typically about 150 min or less, e.g., about 140 min or less, about 130 min or less, about 120 min or less, about 110 min or less, about 100 min or less, about 90 min or less, about 80 min or less, about 70 min or less, about 60 min or less, about 50 min or less, about 40 min or less, about 30 min or less, about 20 min or less, about 10 min or less, about 5 min or less, about 3 min or less, or about 2 min or less. Alternatively, or in addition to, the second time period is about 0.01 sec or more, e.g., about 0.1 sec or more, about 0.5 sec or more, about 1 sec or more, about 2 sec or more, about 5 sec or more, about 10 sec or more, about 15 sec or more, about 20 sec or more, about 25 sec or more, about 30 sec or more, about 35 sec or more, about 40 sec or more, about 45 sec or more, about 50 sec or more, about 55 sec or more, or about 60 sec or more. These lower and upper limits with respect to the second time period can be used in any combination to describe the second time period (e.g., about 0.01 sec to about 150 min, or about 0.01 sec to about 10 sec, or about 60 min to about 120 min or about 1 min to about 5 min), or can be used singly to define an open-ended range.

In keeping with aspects of the invention, the third mixture can be the same or different from the first mixture. In some embodiments, the third mixture is the same as the first mixture.

In some embodiments, the third mixture is different from the first mixture, and, if desired, the third mixture is subjected to a separation step to obtain the first mixture and a fourth mixture. In view of this separation step, the first mixture contains a higher content (i.e., enriched) of the substance than the fourth mixture. The separation can be conducted between subjecting the feedstock to a first fluid and providing a first mixture, and can be conducted using any suitable method. In some embodiments, the method of separation is selected from the group consisting of solid liquid separation, filtration (e.g., filter press, belt filter, and the like), gravity separation, centrifugal separation, centripetal separation, screening, and any combination thereof.

In certain aspects of the invention, the temperature between steps can be further manipulated (e.g., reduced, increased, or maintained in a range) to facilitate coalescing of the substance. In some embodiments, the first mixture is maintained above about 70° C. between subjecting the feedstock to a first fluid and agitating the first mixture. In some embodiments, the first mixture is maintained above about 80° C., e.g., above about 90° C., above about 100° C., above about 110° C., above about 115° C., above about 120° C., above about 130° C., above about 140° C., or above about 150° C.

In some embodiments, the first mixture is cooled to a third temperature between the subjecting the feedstock to a first fluid and providing a first mixture. The third temperature and the first temperature can be the same or can be different. The third temperature typically is at or above ambient temperature, e.g., at or above about 20° C., above about 30° C., above about 40° C., above about 50° C., above about 60° C., above about 70° C., above about 80° C., above about 90° C., above about 100° C., above about 110° C., or above about 115° C. The cooling step can be performed using any suitable method. In some embodiments, the first mixture is cooled using a heat exchanger, contacting the first mixture with a second fluid (e.g., a cooler fluid), using flash evaporation, or any combination thereof.

In keeping with some embodiments of the invention, the inventive method further comprises, during and/or after the agitating of the first mixture, reducing the first temperature to a fourth temperature that is below the Tg of the substance present in the first mixture. The first temperature can be reduced to facilitate solidifying the substance to aid removal of solid particles from the mixture, as described herein.

The manner in which aspects of the method is conducted is not particularly limited. For example, aspects of the method can be conducted in continuous mode, batch mode, or semi-batch mode. For example, the agitating and/or subjecting can be conducted in continuous mode, batch mode, or semi-batch mode. In some embodiments the agitating is conducted in batch mode or semi-batch mode, and the subjecting is conducted in continuous mode. In other embodiments, the agitating can be conducted in continuous mode or semi-batch mode, and the subjecting can be conducted in batch mode. Other combinations are contemplated, and other aspects of the method can also be carried out in continuous, batch, or semi-batch modes. As used herein, "continuous" refers to a process which is uninterrupted for its duration, or interrupted, paused or suspended only momentarily relative to the duration of the process. Treatment of biomass is "continuous" when biomass is fed into the apparatus without interruption or without a substantial interruption, or processing of said biomass is not done in a batch process. In "batch" mode or "semi-batch" mode, steps of the process may be conducted sequentially, simultaneously, or a combination of both.

Certain aspects of the methods of the invention may be carried out in any suitable reactor, including, but not limited to, a tank, a tubular reactor, a digester (vertical, horizontal, or inclined), and the like. Suitable digesters include the digester system described in U.S. Pat. No. 8,057,639, which includes a digester and a steam explosion unit, the entire disclosure of which is incorporated by reference.

The following examples further illustrate the invention but, of course, should not be construed as in any way limiting its scope.

EXAMPLE 1

This example demonstrates a method of coalescing lignin from an aqueous slurry of fractionated biomass into lignin particles having a suitable particle size, in accordance with an embodiment of the invention.

A feedstock comprising an aqueous slurry of size-reduced lignocellulosic biomass was subjected to a temperature of about 200-250° C. for a period of about 1-8 minutes under a pressure sufficient to keep all of the fluid in liquid form (generally less than about 50 bar). The resulting mixture was filtered, the solids re-slurried with water, and the slurry subjected to a temperature of about 350-400° C. for a period of less than about 10 sec under a pressure sufficient to keep all of the fluid in liquid or supercritical form (generally less than about 250 bar).

The resulting mixture (i.e., the first mixture) was subjected to turbulent agitation through the use of a pump around loop or an impeller, along with boiling. It was observed that a significant proportion of the lignin formed globules in the 250-1500 µm range. These larger lignin balls settled rapidly when agitation was stopped, and the suspension was found to filter easily on a 60 mesh screen (corresponding to 250 µm openings). These large solids were found to be lignin having a purity greater than about 90%. Compositional analysis was substantially performed according to the standard NREL protocol for biomass analysis (NREL/TP-510-42618, herein incorporated by reference in its entirety)

The filtration on a 60 mesh screen was performed as follows. A portion of the suspension from the product tank was passed through the screen, and some black solids were retained on the screen. It was determined that about 14 wt % of the mass of the original suspension was retained on the screen. Analysis of the original suspension determined the composition to be about 60% acid insoluble lignin and the remainder cellulose. The black solids collected on the screen were determined to be about 91% lignin.

The results show that lignin having a purity greater than 90% can be coalesced under turbulent conditions from an aqueous slurry of fractionated biomass into particles having a suitable size for collection, and the lignin particles can be collected by filtration.

EXAMPLE 2

This example demonstrates a method of coalescing lignin into particles having a suitable particle size from an aqueous slurry of fractionated biomass, in accordance with an embodiment of the invention.

A process similar to that carried out in Example 1 was performed, except the first mixture was cooled down in two or three sequential flash tanks operating under high velocity shear, prior to being expelled into a product tank. When two sequential flash tanks were employed, the flash tank temperatures were about 170-250° C. in the first flash tank and about 80-160° C. in the second flash tank. When three sequential flash tanks were employed, the flash tank temperatures were about 180-260° C., about 130-170° C., and about 60-105° C., respectively. After cooling, the cooled mixture was expelled to a product tank stirred at about 70-100° C.

The design of the flash vessels caused the slurry to experience a high shear environment. Low fouling was observed, and the resulting mixture containing particles of lignin having a size conducive to filtration of the mixture.

The results demonstrate that lignin can be coalesced into particles having a suitable size from an aqueous slurry of fractionated biomass under turbulent conditions, and the lignin particles can be collected without significant fouling of the apparatus.

COMPARATIVE EXAMPLE 1

This comparative example demonstrates the difficulty coalescing lignin from an aqueous slurry of fractionated biomass without suitable temperature control and suitable agitation.

A process similar to that carried out in Example 1 was performed, except the first mixture expelled to the product tank was allowed to remain quiescent (i.e., substantially not agitated), and the tank was allowed to cool to below 60° C. This process formed a plug of solid material at the bottom of the tank. On testing, this material was found to be mostly lignin-based.

The results show that lignin coalesces into an unfilterable mass in the absence of suitable conditions, i.e., without suitable temperature control and turbulent agitation.

COMPARATIVE EXAMPLE 2

This comparative example demonstrates the difficulty coalescing lignin from an aqueous slurry of fractionated biomass without suitable temperature control and suitable agitation.

A process similar to that carried out in Example 1 was performed, except the first mixture was rapidly cooled to 40-70° C. without agitation before transfer to the product tank. It was observed that a fine suspension was formed with an average particle size of less than 200 µm. The suspension settled slowly and filtered slowly, which are undesirable properties.

COMPARATIVE EXAMPLE 3

This comparative example demonstrates the difficulty coalescing lignin from an aqueous slurry of fractionated biomass without suitable temperature control and suitable agitation.

A process similar to that carried out in Example 2 was performed, except the flash vessels were designed for minimal liquid agitation. It was observed that significant deposition of solids on the vessel surfaces occurred, and the bottom of the flash vessels plugged up with fouling material.

The results show that lignin fouls the apparatus without suitable temperature control and agitation.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method comprising:
   (a) providing at a first temperature a first mixture comprising a substance; wherein the substance comprises lignin and wherein the first temperature is above about 60° C.; and
   (b) agitating at least a portion of the first mixture under turbulent conditions at Reynolds number of at least 4,000 for a first time period at the first temperature, thereby causing particles comprising the substance having a first average size of less than about 200 microns to collide and form into larger particles having a second average size of greater than about 200 microns, thereby forming a second mixture.

2. The method of claim 1, further comprising, prior to providing the first mixture:
   (a') supplying a feedstock comprising the substance; and
   (a") subjecting the feedstock at a second temperature of at least about 140° C. for a second time period to a first fluid comprising hot compressed water or supercritical water, thereby forming a third mixture that is the same as or different from the first mixture.

3. The method of claim 2, wherein the feedstock is unfractionated biomass.

4. The method of claim 2, wherein the feedstock is fractionated biomass in which at least a portion of at least one of hemicellulose and cellulose originally present therein has been substantially removed.

5. The method of claim 4, wherein the second temperature is at least about 350° C.

6. The method of claim 2, wherein the first mixture is maintained above about 70° C. between the subjecting the feedstock and the agitating the first mixture.

7. The method of claim 1, wherein the agitating comprises agitation in a flash vessel.

8. The method of claim 1, wherein the agitating comprises sequential agitation in one or more flash vessels, and wherein the sequential agitation comprises agitating in a first flash vessel operated at a temperature of about 170° C. to about 250° C. followed by agitating in a second flash vessel operated at a temperature of about 80° C. to about 160° C.

9. The method of claim 1, wherein the agitating comprises sequential agitation in one or more flash vessels, and wherein the sequential agitation comprises agitating in a first flash vessel operated at a temperature of about 180° C. to about 260° C., followed by agitating in a second flash vessel operated at a temperature of about 130° C. to about 170° C., followed by agitating in a third flash vessel operated at a temperature of about 60° C. to about 105° C.

10. The method of claim 1, wherein the first temperature is at least about 80° C.

11. The method of claim 1, wherein the first time period is about 1 min to less than 6 hours.

12. The method of claim 1, wherein the agitating is performed under a condition insufficient to hydrolyze a significant portion of at least one of hemicellulose and cellulose, whether or not present.

13. The method of claim 1, wherein the larger particles comprising the substance contain at least about 80 wt % of the substance on a dry basis.

14. The method of claim 1, wherein the first temperature is at or above the glass transition temperature of the substance.

15. The method of claim 1, wherein at least one of conditions (i), (ii), and (iii) is satisfied:
   (i) the agitating is performed substantially in the absence of enzymes;
   (ii) the agitating is performed in the presence of one or more enzymes under conditions that would be insufficient for the one or more enzymes to hydrolyze a significant portion of a substrate, whether or not the substrate is present;
   (iii) the first mixture is not produced by a process selected from the group consisting of sulfite pulping, Kraft pulping, soda pulping, acid hydrolysis, enzymatic hydrolysis, organosolv pulping, and any combination thereof.

16. The method of claim 15, wherein the substrate comprises a saccharide.

17. The method of claim 1, wherein the first mixture is boiling during the agitating.

* * * * *